Sept. 5, 1933.                C. R. FABEN                1,925,438
                    PRODUCTION OF ACTIVATED CARBON
                         Filed Aug. 6, 1931
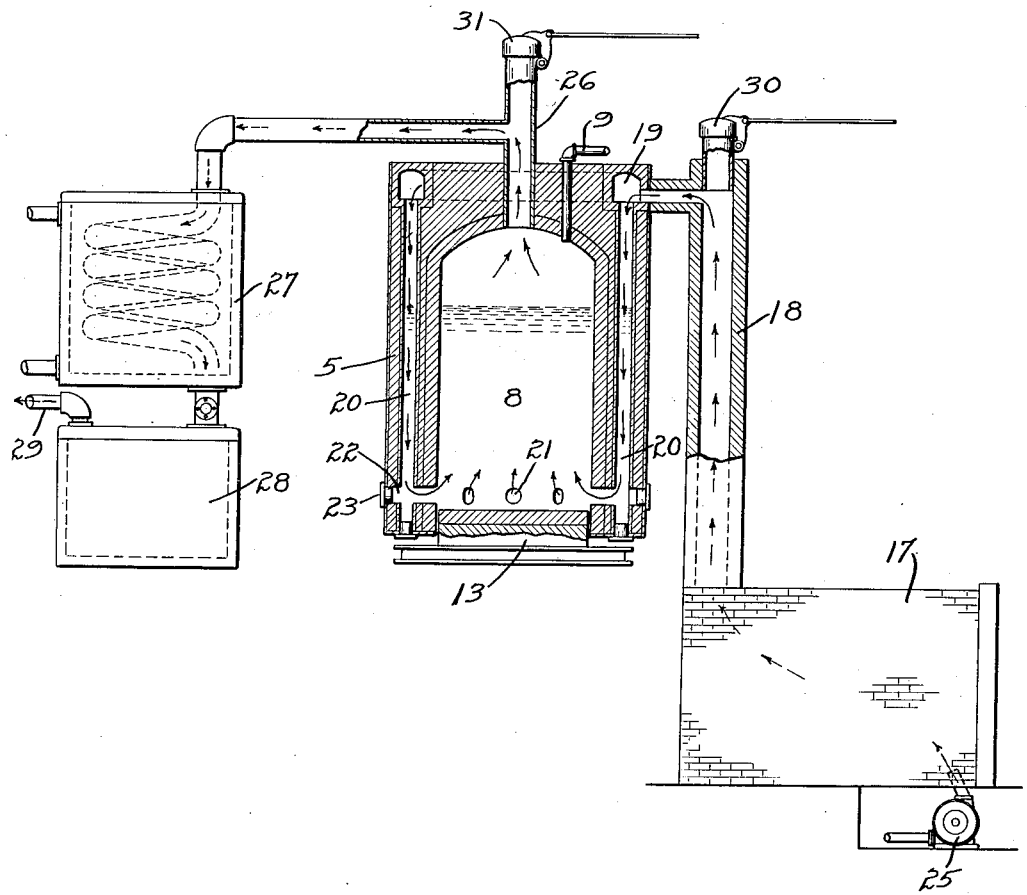
Inventor
Charles R. Faben
By  Owen + Owen
              Attorneys Patented Sept. 5, 1933

1,925,438

UNITED STATES PATENT OFFICE 1,925,438

PRODUCTION OF ACTIVATED CARBON

Charles R. Faben, Toledo, Ohio, assignor to Harry G. Jennison, Toledo, Ohio

Application August 6, 1931. Serial No. 555,559

7 Claims. (Cl. 252—3)

This invention relates to activated carbon and to a method of producing the same from coal-tar, pitch, heavy petroleum residues or other liquid or liquefiable hydrocarbons of a similar nature. These compounds are hereinafter termed "heavy liquid hydrocarbons".

Hitherto the chief source of commercial gas-adsorbent or activated carbon has been charcoal produced from wood, cocoanut shells or other vegetation. No process has been known by which a good quality of activated carbon could be produced from coal or petroleum products. Coke produced by methods heretofore in vogue is incapable of activation.

With the above conditions in mind, the present invention has for its object the economical production of activated carbon from heavy liquid hydrocarbons. The natural supply of raw material for this process is practically unlimited and is in fact largely a by-product of other industries, so that it will be possible to produce activated carbon in such quantities and at such low cost that it may be used for many purposes where the cost has heretofore precluded its use on a commercial scale.

According to my invention, the process of producing the activated carbon includes two essential stages. During the first of these stages the heavy liquid hydrocarbons are subjected to a destructive distillation which, without allowing the temperature to rise above 700° C., is carried to a point where the residue is a hard, low volatile coke found to be capable of activation to a high degree. The activation of this coke residue constitutes the second stage of the process.

The first stage of the process will be more particularly described with reference to the accompanying drawing, which is a diagrammatic view of the apparatus by which it is carried out.

As illustrated in the drawing, the still 5 is supported at some distance above the ground and is formed largely of concrete encased in steel and lined with suitable firebrick, providing a chamber 8 to receive a batch of liquid which may be introduced through an inlet pipe 9. The bottom of the still is provided with a door 13 also composed largely of concrete and lined with firebrick. During the distillation this door is tightly closed, but may be opened at the conclusion of the first stage of the process to permit the coke to drop out.

The heat for effecting the distillation is supplied by a furnace 17, from which the products of combustion pass through a stack 18 and into an annular manifold 19 at the upper end of the still. A number of pipes 20, embedded in the concrete wall of the still, lead downwardly from the manifold 19 to inlets 21 arranged radially at the bottom of the chamber 8. In alignment with each inlet 21 is a clean-out opening 22, which is normally closed by a plug 23. Similar clean-out openings are provided in alignment with the passageways 20. Forced draft is provided for the furnace 17 by means of a blower 25.

After the combustion gases are discharged into the still through the openings 21, they bubble up through the liquid therein and are discharged into a stack 26, which leads to a condenser 27 and thence to a reservoir 28 whence the uncondensed gases are drawn through a pipe 29 by means of a suction pump of sufficient capacity to take care of a volume of gas large enough to maintain the requisite pressure and temperature within the still. The stacks 18 and 26 are provided with dampers 30 and 31, respectively, which may be opened when desired.

During the distillation, if the blower alone is depended upon to force the gases through the openings 21 into the bottom of the still, a pressure considerably above that of the atmosphere must be maintained above the fire and in the stack 18 in order to overcome the hydrostatic pressure of the liquid at the bottom of the still. This would necessitate the forcing of a great deal more air through the furnace than is necessary to support combustion, resulting in too high a percentage of oxygen in the flue gases and also inevitably causing a good deal of gas to escape through the interstices in the upper part of the furnace and the stack. If the suction pump alone is used, the pressure within the stack 18 must be considerably below atmospheric, with the result that an excess of air will be drawn through the fire as well as through the interstices in the upper part of the furnace and stack. By using both a blower and a suction pump, however, the action may be regulated so as to maintain substantially atmospheric pressure above the fire and in the stack 18 at all times, with the result that very little uncombined oxygen is introduced into the still.

It will also be appreciated that by a proper regulation of the suction pump and blower, the temperature within the still may be closely controlled. A pyrometer is provided for indicating this temperature. This control of temperature is important since, in order to produce a residue that is capable of activation, the temperature should not go above 700° C. By maintaining a low enough pressure within the still, the distillation may without going above this temperature, be carried to a point where a low volatile coke is left as a residue.

In the second stage of the process, the coke is activated by differential oxidation. In the preferred method, the coke is crushed or pulverized, preferably to such an extent that it will pass a screen of 8 mesh and be retained by a 16 mesh, and then a stream of hot combustion gases is passed through it until it reaches a high temperature. The most complete activation is attained at a temperature near 900° C. As soon as this temperature is reached superheated steam is passed through the mass while the temperature is maintained. The optimum time of treatment at this temperature is six to eight hours. This treatment may be effected with apparatus which is the same or similar to that used in the first stage.

If the activated carbon produced by my process is examined by an expert under the microscope, it may be identified by the character and arrangement of the pores, as well as by its chemical analysis, but for the purpose of the present application, it may best be defined by reference to the source from which it is derived.

What is claimed is:

1. The method of producing activated carbon from a heavy hydrocarbon liquid, which comprises destructively distilling a batch of said liquid by continuously conducting hot gases produced by the combustion of carbonaceous fuel into said batch near the bottom thereof and allowing said gases to bubble up through the liquid under the influence of induced draft until the residue is a low volatile coke, then activating said coke by the oxidation and removal therefrom of adsorbed gases and inactive carbon molecules.

2. The method of producing activated carbon from a heavy hydrocarbon liquid, which comprises destructively distilling a batch of said liquid by continuously conducting combustion gases into said batch near the bottom thereof and allowing said gases to bubble up through the liquid under the influence of induced draft until the residue is a low volatile coke, then activating said coke by maintaining its temperature near 900° C. in the presence of a flowing oxidizing agent.

3. The method of producing activated carbon from a heavy hydrocarbon liquid, which comprises destructively distilling a batch of said liquid by continuously conducting combustion gases into said batch near the bottom thereof and allowing said gases to bubble up through the liquid under the influence of induced draft until the residue is a low volatile coke, then activating said coke by passing superheated steam therethrough while its temperature is maintained near 900° C.

4. The method of producing activated carbon from a heavy hydrocarban liquid, which comprises destructively distilling said liquid by continuously conducting therethrough under induced draft the gases resulting from the combustion of carbonaceous fuel until the residue is a low volatile coke, the draft and consequently the volume of combustion gases passing through the liquid being so controlled as to limit the temperature of the liquid being distilled to a maximum temperature of approximately 700° C., then activating the coke residue by oxidation and removal therefrom of adsorbed gases and inactive carbon molecules.

5. The method of producing activated carbon from a heavy hydrocarbon liquid, which comprises destructively distilling a batch of said liquid by continuously conducting hot gases produced by the combustion of carbonaceous fuel into said batch near the bottom thereof and allowing said gases to bubble up through the liquid under the influence of induced draft until the residue is a low volatile coke, the draft and consequently volume of combustion gases passing through the liquid being so controlled as to limit the temperature of said liquid as it is distilled to a maximum temperature of approximately 700° C., then activating the coke residue by the oxidation and removal therefrom of adsorbed gases and inactive carbon molecules.

6. As an article of manufacture, activated carbon produced from the residue resulting from the destructive distillation of heavy liquid hydrocarbons by causing hot combustion gases to bubble up through the same.

7. As an article of manufacture, activated carbon produced from coke constituting the ultimate residue from the destructive distillation of heavy liquid hydrocarbons by causing hot combustion gases to bubble up through said liquid in direct contact therewith.

CHARLES R. FABEN.